US010416626B2

(12) United States Patent
Kim et al.

(10) Patent No.: US 10,416,626 B2
(45) Date of Patent: Sep. 17, 2019

(54) HOME APPLIANCE AND CONTROL METHOD THEREOF

(71) Applicant: LG Electronics Inc., Seoul (KR)

(72) Inventors: Yanghwan Kim, Changwon-si (KR); Changhan Ahn, Changwon-si (KR); Chansung Jeon, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 410 days.

(21) Appl. No.: 15/276,369

(22) Filed: Sep. 26, 2016

(65) Prior Publication Data

US 2017/0010593 A1 Jan. 12, 2017

Related U.S. Application Data

(62) Division of application No. 13/972,047, filed on Aug. 21, 2013, now abandoned.

(30) Foreign Application Priority Data

Aug. 31, 2012 (KR) .................. 10-2012-0096753
Aug. 31, 2012 (KR) .................. 10-2012-0096772
Aug. 31, 2012 (KR) .................. 10-2012-0096802

(51) Int. Cl.
    *G05B 15/02* (2006.01)
    *H04L 12/28* (2006.01)
    *H04L 12/24* (2006.01)

(52) U.S. Cl.
    CPC .......... *G05B 15/02* (2013.01); *H04L 12/2814* (2013.01); *H04L 41/0668* (2013.01); *H04L 41/0833* (2013.01); *H04L 2012/285* (2013.01); *Y04S 40/162* (2013.01); *Y04S 40/166* (2013.01)

(58) Field of Classification Search
    CPC . G05B 15/02; H04L 41/0668; H04L 12/2814; H04L 2012/285; H04L 41/0833; Y04S 40/166; Y04S 40/162
    See application file for complete search history.

(56) References Cited

U.S. PATENT DOCUMENTS

| 6,185,483 | B1 | 2/2001 | Drees |
| 8,730,018 | B2 | 5/2014 | Besore et al. |
| 2003/0178894 | A1 | 9/2003 | Ghent |
| 2008/0224892 | A1 | 9/2008 | Bogolea et al. |
| 2008/0262979 | A1 | 10/2008 | Metcalfe |

(Continued)

FOREIGN PATENT DOCUMENTS

| CN | 1278339 A | 12/2000 |
| CN | 1503482 A | 6/2004 |

(Continued)

*Primary Examiner* — Nathan L Laughlin
(74) *Attorney, Agent, or Firm* — Dentons US LLP

(57) ABSTRACT

An electric appliance includes a driving unit operating on the basis of energy information including information with respect to an energy price, a communication unit requesting the energy information to an external component, a memory unit for storing the energy information received through the communication unit, and a control unit controlling the communication unit such that the communication unit receives first energy information corresponding to a present time of the energy information and receives second energy information that is information except for the first energy information.

13 Claims, 15 Drawing Sheets

(56) References Cited

U.S. PATENT DOCUMENTS

| | | |
|---|---|---|
| 2011/0098869 A1 | 4/2011 | Seo et al. |
| 2011/0153110 A1* | 6/2011 | Drake .................. A47L 15/0047 |
| | | 700/296 |
| 2011/0264245 A1* | 10/2011 | Lim ........................ H04L 12/12 |
| | | 700/90 |
| 2011/0270452 A1 | 11/2011 | Lu et al. |
| 2012/0073603 A1 | 3/2012 | Graven |
| 2013/0030576 A1 | 1/2013 | Drew et al. |
| 2013/0204448 A1* | 8/2013 | Lee ........................ G01D 4/004 |
| | | 700/291 |
| 2013/0261803 A1 | 10/2013 | Kolavennu |
| 2013/0274942 A1 | 10/2013 | Rees |

FOREIGN PATENT DOCUMENTS

| | | |
|---|---|---|
| CN | 2733374 Y | 10/2005 |
| CN | 1829139 A | 9/2006 |
| CN | 102136101 A | 7/2011 |
| CN | 102598580 A | 7/2012 |
| JP | 2010007946 A | 1/2010 |

* cited by examiner

Fig. 9
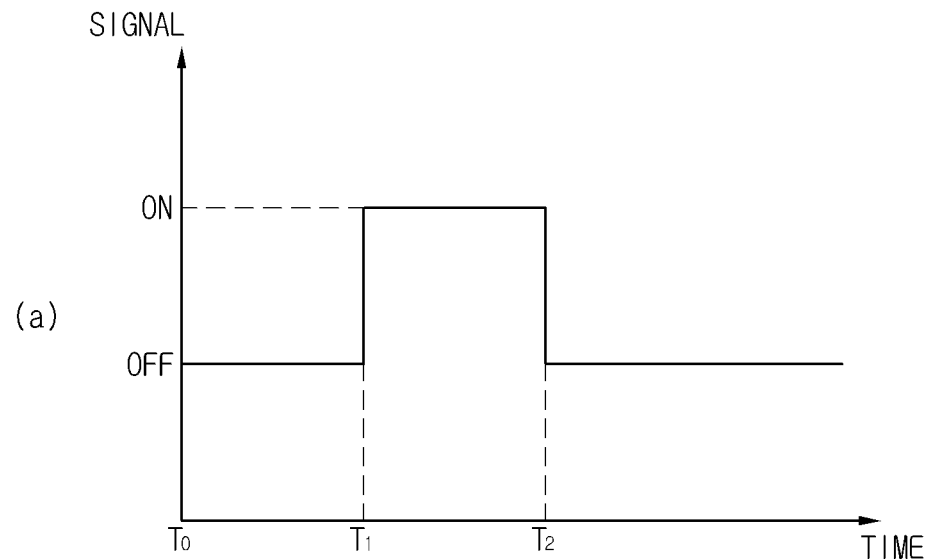
(a)
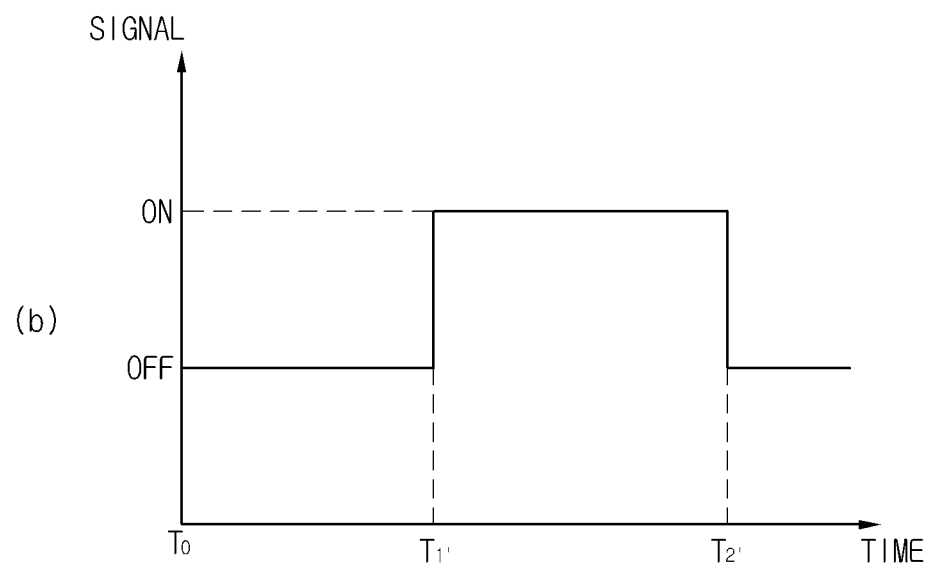
(b)

Fig. 10
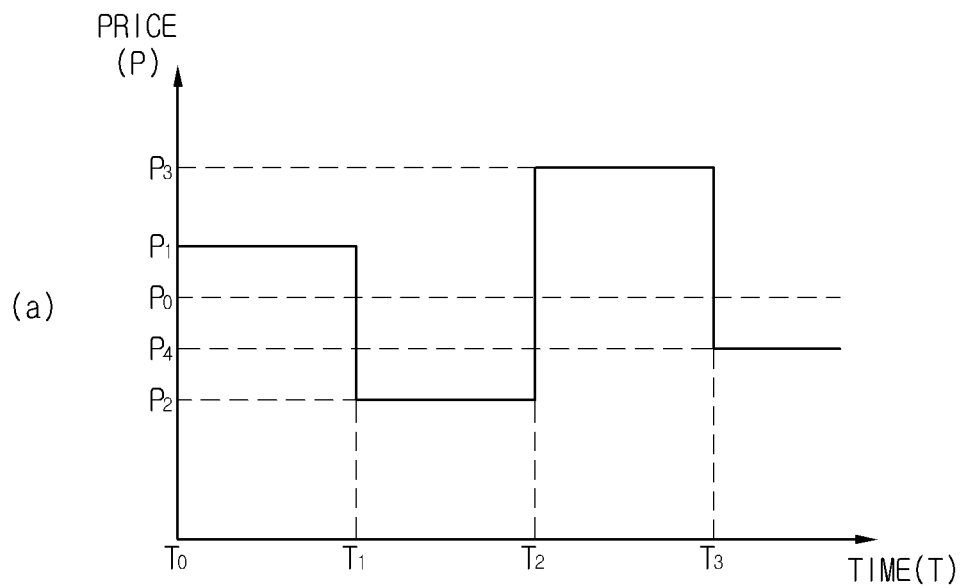
(a)
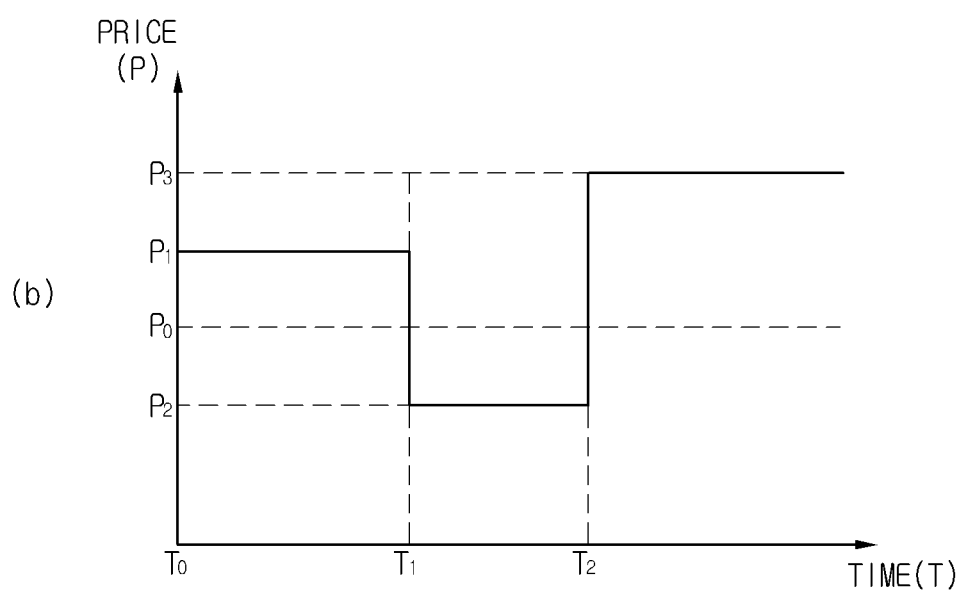
(b)

Fig. 11
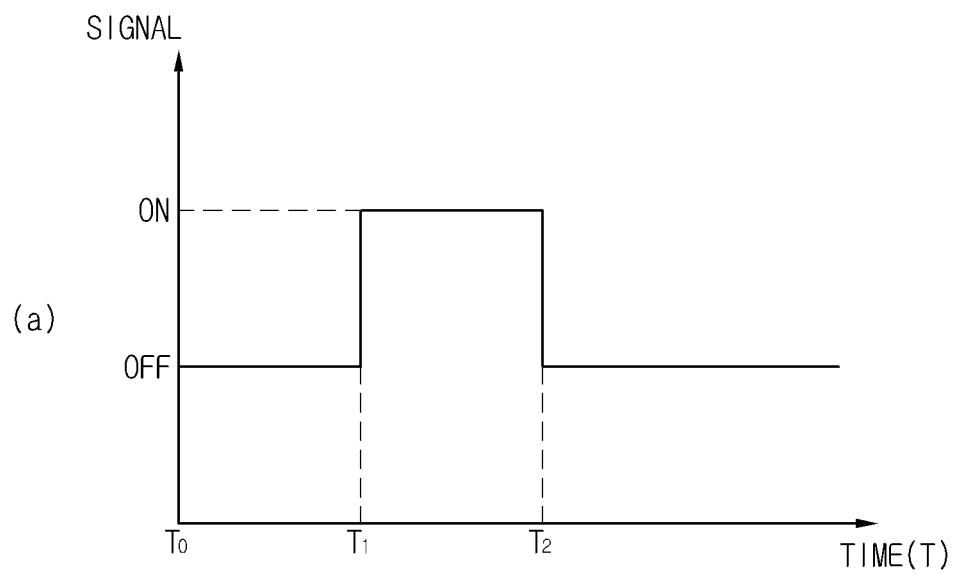
(a)
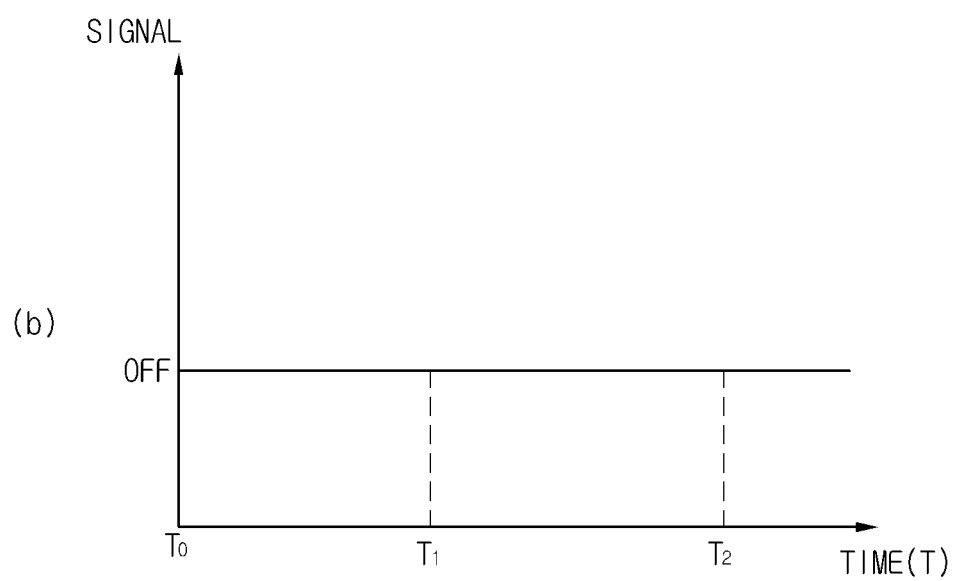
(b)

Fig. 12
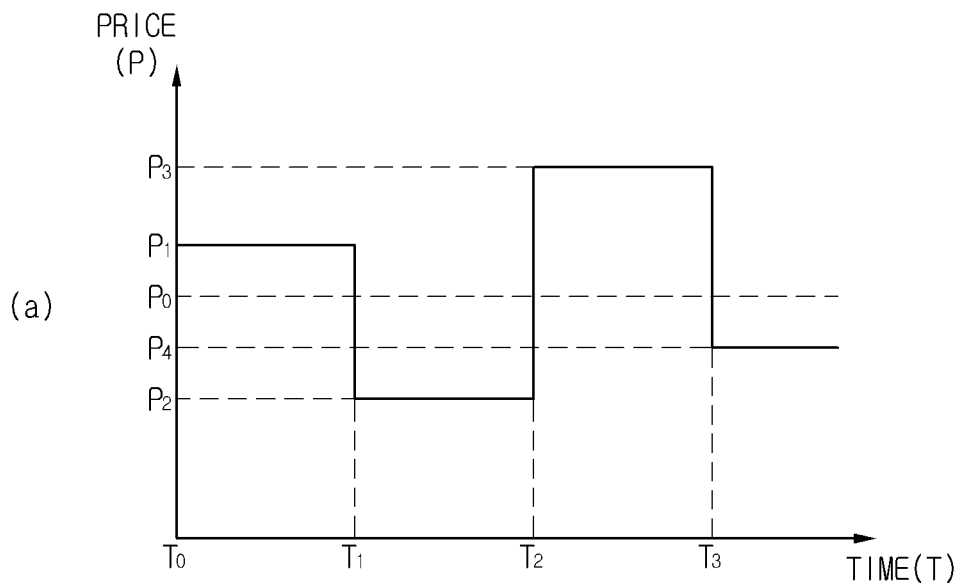
(a)
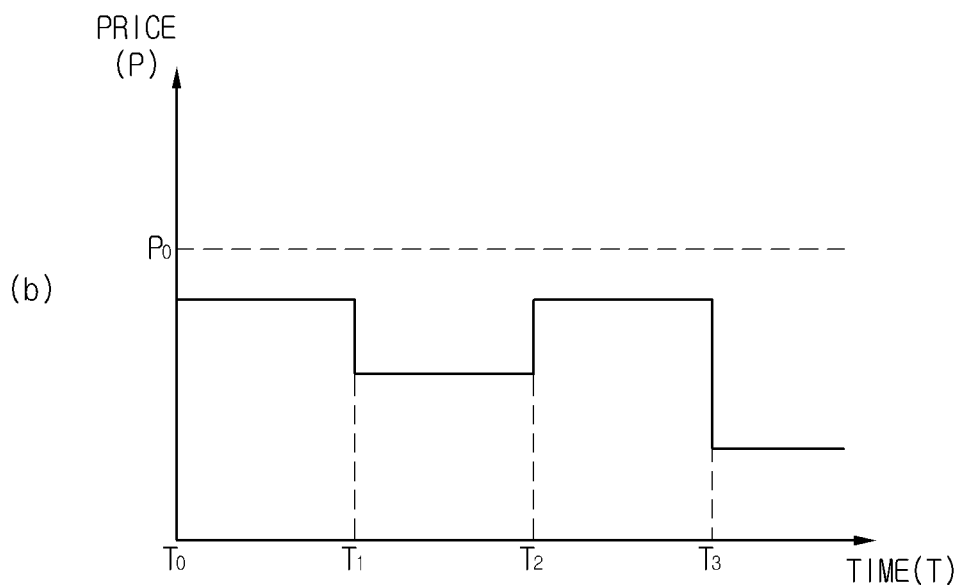
(b)

HOME APPLIANCE AND CONTROL METHOD THEREOF

CROSS-REFERENCE TO RELATED APPLICATIONS

This application is a Divisional Application of U.S. patent application Ser. No. 13/972,047 filed on Aug. 21, 2013, which claims priority to Korean Patent Application No. 10-2012-0096753, filed on Aug. 31, 2012 in the Korean Intellectual Property Office, Korean Patent Application No. 10-2012-0096772, filed on Aug. 31, 2012, and Korean Patent Application No. 10-2012-0096802, filed on Aug. 31, 2012 all of which are hereby incorporated by reference in their entirety.

BACKGROUND

The present disclosure relates to home appliance and control method thereof.

In general, electric appliances provided in homes include washing machines, refrigerators, cookers, cleaners. and etc. In a related art, electric appliances are driven by using an electric power having predetermined power information. For example, a fee of an electric power supplied into a home is constant according to time.

However, an electric power having time-variable power information due to energy-saving policies can be supplied in recent years.

When driving the electric appliances on the basis of the time-variable power information, a user should separately confirm the power information through Internet. Then, the user should determine an operation time or course of each of the electric appliances on the basis of the confirmed power information.

Particularly, the user may intend to confirm power information corresponding to the present time. Here, since the power information provides a predetermined period, e.g., daily, weekly, and monthly information, the user should calculate driving types (e.g., a time, a course, and the like) of the electric appliances one by one.

For example, it may be restricted to instinctively determine an operation start time, an operation end time, or an operation course of each of the electric appliances by the user on the basis of the operation information provided periodically.

SUMMARY

Embodiments provide an electric appliance that is capable of easily receiving power information from the outside.

In one embodiment, an electric appliance includes: a driving unit operating on the basis of energy information including information with respect to an energy price; a communication unit requesting the energy information to an external component; a memory unit for storing the energy information received through the communication unit; and a control unit controlling the communication unit such that the communication unit receives first energy information corresponding to a present time of the energy information and receives second energy information that is information except for the first energy information.

When the electric appliance is turned on, the communication unit may request the energy information to the external component.

The memory unit may include a volatile memory in which the energy information stored in the memory unit is lost when the electric appliance is turned off.

When the electric appliance is turned on, the memory unit stores new energy information received through the communication unit.

The memory unit may include a nonvolatile memory in which the energy information stored in the memory unit is maintained even though the electric appliance is turned off.

When the electric appliance is turned on, the energy information previously stored in the memory unit may be changed into new energy information received through the communication unit if the new energy information is different from the energy information stored in the memory unit.

The memory unit may include a module memory disposed within the communication unit or a memory separately provided with respect to the communication unit.

The first energy information and the second energy information may be successively or unilaterally received.

When the first and second energy information are successively received, the communication unit may request and receive the first energy information, and transmit a reception confirmation signal to the external component, to thereby request and receive the second energy information.

When the second energy information is completely received, the communication unit may receive a transmission completion signal from the external component.

The communication unit may receive the first energy information together when the second energy information is received to confirm whether the first energy information is changed.

When the first and second energy information are unilaterally received, the communication unit may receive the second energy information without transmitting a reception confirmation signal after the first energy information is received.

When the information with respect to the energy price is changed, the communication unit may request energy information to the external component at a time at which the energy price is changed or before/after the energy price is changed.

The communication unit may periodically request the energy information to the external component to confirm whether the energy information is changed.

If the energy information is changed, the communication unit may receive the changed energy information from the external component without separately requesting the reception of the energy information.

Energy price identification information, a start time for applying the energy price, and an energy price duration may be tabled and transmitted from or received into the first or second energy information.

The external component may include a smart meter for metering an energy usage amount of the electric appliance to transmit price information with respect to energy to the electric appliance.

In another embodiment, a method of controlling an electric appliance including a communication unit communicable with an external component includes: receiving first energy price-related information from the external component; determining a first operation method on the basis of the first energy price-related information; receiving second energy price-related information that is changed from the first energy price-related information before the electric appliance operates according to the first operation method;

and allowing the electric appliance to operate in a second operation method on the basis of the second energy price-related information.

The first energy price-related information and the second energy price-related information may include low-price information and high-price information which are classified according to price information with respect to an energy price and control reference information.

The high-price information may include at least one of first price information including on-peak information that is received when the energy price is greater than a reference value and first control reference information including curtailment information for requesting reduction in use of energy or supply power leakage information for informing that an amount of suppliable electricity leaks.

The low-price information may include at least one of second price information including off-peak information that is received when the energy price is less than the reference value and second control reference information including curtailment information for informing that the energy is capable of increasing in use or excessive supply power amount for informing that an amount of suppliable electricity is sufficient.

The first operation method may include a power-saving mode or a normal mode according to whether the first energy price-related information is the high-price information or the low-price information.

The power-saving mode may be an operation mode in which an energy usage price of the electric appliance is capable of being reduced on the basis of the energy prices-related information received from the external component, and the normal mode may be an operation mode that operates on the basis of a command recognized by or inputted into the electric appliance without being based on the energy price-related information.

One method of the first and second operation methods may be one of the power-saving mode and the normal mode, and the other method may be the other one of the power-saving mode and the normal mode.

The second energy price-related information may include information in which a time period with respect to the energy price in information constituting the first energy price-related information moves.

The time period with respect to the energy price may include on-peak or off-peak information constituting the energy information.

The time period with respect to the energy price may include an on/off time period with respect to whether control reference information is applied.

As the time period with respect to the energy price moves, the second operation method is changed in operation time with respect to the same operation method as the first operation method.

The second energy price-related information may include information in which an occurrence of the first energy price-related information is cancelled.

The first energy price-related information may include information in which the high-price or low-price information is generated at a specific time period, and the second energy price-related information include information in which the generation of the high-price or low-price information at the specific time period is cancelled.

The electric appliance may receive the second energy price-related information when a difference value between an estimated demand and an actual demand is greater or less than a set value in a state where the electric appliance receive the first energy price-related information.

The electric appliance may include an ordinary operating product to which a power is applied.

In further another embodiment, an electric appliance includes: a driving unit operating on the basis of energy price-related information; a communication unit communicating with an external component with respect to the energy price-related information; and a control unit controlling the operation of the driving unit on the basis of the energy price-related information received by the communication unit, wherein, if the control unit determines that the communication unit and the external component are in a communication failure state, the control unit determines a cause of the communication failure state from a plurality of preset mapping information.

The electric appliance may further include a memory unit, a communication failure cause in the communication failure state may be determined as one of the plurality of mapping information.

The plurality of mapping information may include: first mapping information with respect to a change of a network key using the external component as a master device; second mapping information with respect to a change of a communication channel that is used for the external component and the communication unit; third mapping information with respect to a state in which the external component is turned off; and fourth mapping information with respect to an initialization of a network connecting the external component to the communication unit.

When the network key is changed in a state where the communication unit does not receive an update message of the network key from the external component, the communication failure cause may be determined to correspond to the first mapping information When the network key is changed in a state where the communication unit does not receive a channel change message from the external component, the communication failure cause may be determined to correspond to the second mapping information.

When the external component is turned off due to an abnormal cause and becomes in the communication failure state, the communication failure cause may correspond to the third mapping information, and the abnormal cause may include a blackout or breakdown state.

When it is recognized that the electric appliance withdraws from the network with the external component, the communication failure cause may correspond to the fourth mapping information.

When it is recognized that the communication failure cause corresponds to the first to third mapping information, a communication recovery program operates to convert the communication failure state into the communicable state.

When it is recognized that the communication failure cause corresponds to the first to third mapping information, the communication recovery program may be configured so that a network key update message or a channel change message is transmitted from the external component to the electric appliance, and the electric appliance transmits a confirmation signal with respect to the transmission of the message.

When it is recognized that the communication failure cause corresponds to the third mapping information, the communication recovery program may be configured so that, after standing by until the external component is turned on, a communication preparation confirmation message is transmitted from the external component to the electric appliance, and the electric appliance transmits a confirmation signal with respect to the transmission of the message.

When it is recognized that the communication failure cause corresponds to the fourth mapping information, the network connection between the external component and the communication may be initialized, and a network participation request signal may be transmitted from one of the external component and the communication unit, and the other one may transmit a permission signal with respect to the network participation request signal to perform network re-connection, thereby converting the communication failure state into the communicable state.

In a process of determining whether the external component and the communication unit are communicable with each other, a check signal may be transmitted from one of the external component and the communication unit, and when the check signal is transmitted in number greater than a preset number, or a response signal is not received from the other one even though the check signal is transmitted at a time greater than a preset time, it may be recognized as the communication failure state.

In a process of determining whether the external component and the communication unit are communicable with each other, a check signal may be transmitted from one of the external component and the communication unit, and when the intensity of a response signal from the other one is less than the preset intensity, it may be recognized as the communication failure state.

The details of one or more embodiments are set forth in the accompanying drawings and the description below. Other features will be apparent from the description and drawings, and from the claims.

BRIEF DESCRIPTION OF THE DRAWINGS

FIGS. 9(a), 9(b), 10(a) and 10(b) are graphs illustrating an energy information change according to the fourth embodiment.

FIGS. 11(a), 11(b), 12(a) and 12(b) are graphs illustrating an energy information change according to a fifth embodiment.

DETAILED DESCRIPTION OF THE EMBODIMENTS

Reference will now be made in detail to the embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present invention will fully convey the concept of the invention to those skilled in the art.

Figure 1:
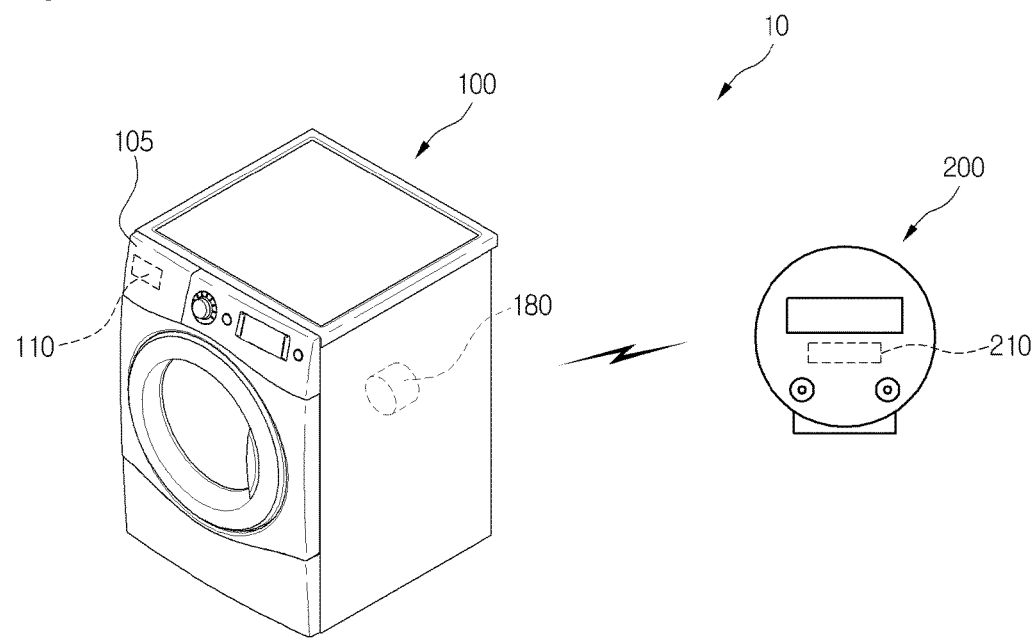
FIG. 1 is a view of an electric appliance and an external component according to a first embodiment.
Figure 2:
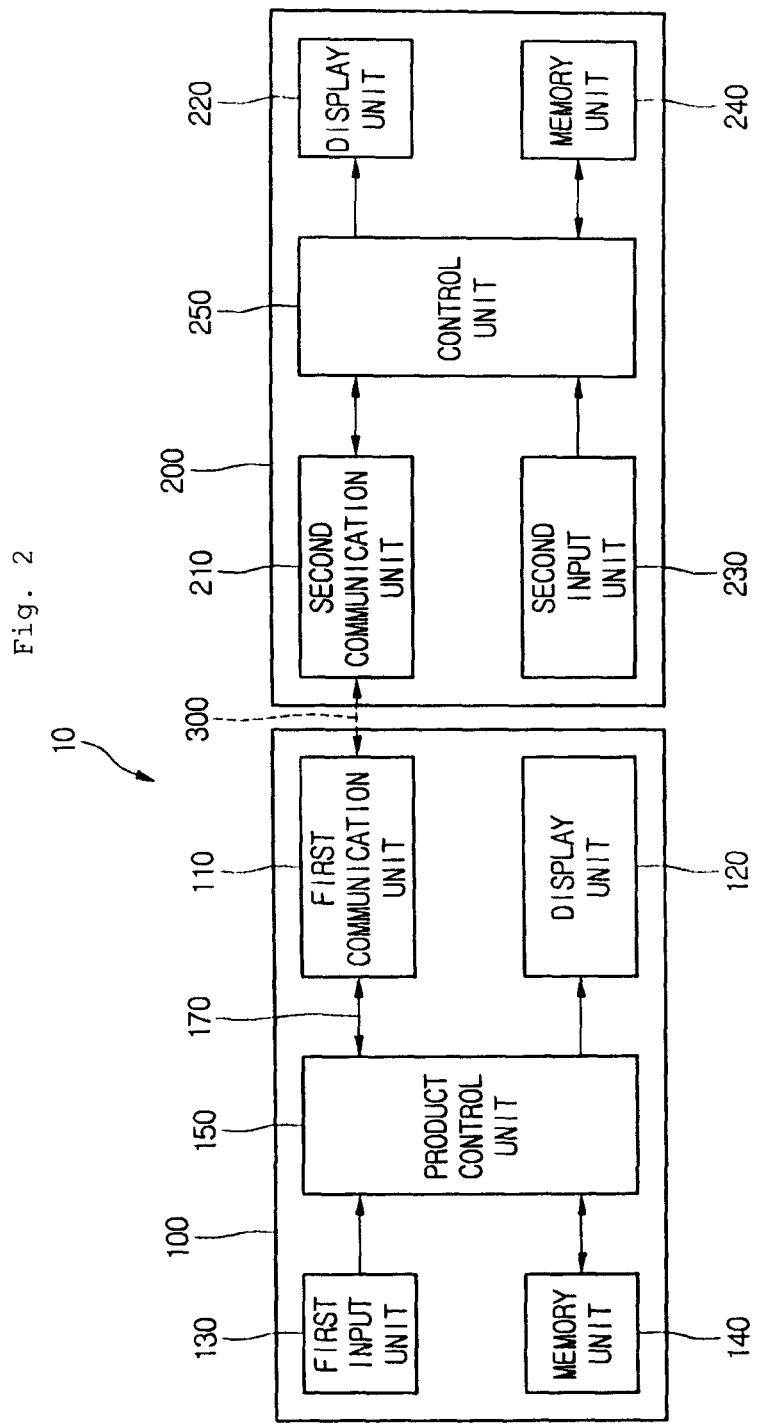
FIG. 2 is a block diagram of the electric appliance and the external component according to the first embodiment.

FIG. 1 is a view of an electric appliance and an external component according to a first embodiment, and FIG. 2 is a block diagram of the electric appliance and the external component according to the first embodiment.

Referring to FIGS. 1 and 2, a network system 10 according to a first embodiment includes an electric appliance 100 for performing a preset function as one component constituting the network system 10 and an external component provided communicable with the electric appliance 100 as the other component constituting the network system 10.

In FIG. 1, a washing machine is illustrated as an example of the electric appliance. However, the present disclosure is not limited to this kind of electric appliance. For example, a refrigerator, a cooking appliance, a dryer, an air conditioner, a cleaner, or a water purifier in addition to the washing machine may be applied.

The electric appliance 100 includes a driving unit 180 for performing a function thereof. The driving unit 180 may be driven based on information related to energy supplied from the outside. The energy-related information includes information related to energy charge.

For example, the information related to the energy charge may include an electric power fee. The driving unit 180 may be driven in a time-driving manner in which the electric charge is reduced during the operation of the electric appliance 100.

The driving unit 180 may include a motor, a compressor, a heater, a fan and etc.

The external component 200 may be understood as a component providing information related to energy supplied from an external energy source to the electric appliance 100. Here, the external energy source may include at least one of an energy generation component (a power company), an energy distribution component (a power distribution company), and an energy storage component (an energy storage/supply company).

For example, the external component may include a smart meter for metering an amount of electricity used for the electric appliance, an advanced metering infrastructure (AMI) for metering an amount of electricity used in a plurality of electric appliances or used places, or an energy management system (EMS) for controlling a power-saving operation of the electric appliance.

The electric appliance 100 includes a first communication unit 110 for communicably connected to the external component 200, a display unit 120 for displaying an operation state of the electric appliance 100, and a first input unit 130 for inputting a predetermined command to operate the electric appliance 100.

Also, the electric appliance 100 may further include a memory unit 140 for storing operation information of the electric appliance 100 or information related to energy (hereinafter, referred to as energy information) supplied to the electric appliance 100 and a product control unit 150 for controlling the above-described components. For example, the energy information may include power information. Hereinafter, a case in which a power is the energy will be described as an example.

The first communication unit 110 may be understood as a gateway connected to the external component 200. Also, the first communication unit 110 may be provided as a "communication module" inside a front panel 105 of the electric appliance 100 and be separably mounted on the electric appliance 100. Alternatively, the first communication unit 110 may be disposed outside the electric appliance 100, and not built into the electric appliance 100.

Also, the first communication unit 110 receives external information according to a control command of the product control unit 150 to transmit the received information into the product control unit 150 or transmits internal information of the electric appliance 100 to the outside (for example, to the external component 200).

The memory unit 140 may be separately disposed from the first communication unit 110. Alternatively, when the first communication unit 110 is provided as a module, the memory unit 140 may be provided as a memory disposed within the communication module.

Also, a second interface 170 for transmission/reception information (data) may be defined between the first communication unit 110 and the product control unit 150.

The external component 200 includes a second communication unit 210 for communicably connected to the first communication unit 110, a display unit 220 for displaying a user interface of the external component 200, and a second input unit 230 for inputting a predetermined command into the external component 200.

Also, the external component 200 includes a memory unit 240 for storing operation information of the electric appliance 100 and a control unit 250 for controlling the second communication unit 210, the display unit 220, the second input unit 230, and the memory unit 240. Here, the operation information of the electric appliance 100 may include information with respect to an amount of electricity used for the electric appliance.

The second communication unit 210 may transmit the power information to the first communication unit 110 and/or receive the operation information of the electric appliance 100 from the first communication unit 110. A first interface 300 for communicating may be defined between the first communication unit 110 and the second communication unit 210.

The display unit 220 may display the operation information of the electric appliance 100 and/or the power information of the electric appliance 100.

A plurality of information for performing a function of the external component 200 may be stored in the memory unit 240. The plurality of information may include first information related to a power supplied to the electric appliance 100 and second information related to an operation of the electric appliance 100 and/or an amount of electricity used for the electric appliance 100.

Figure 3:
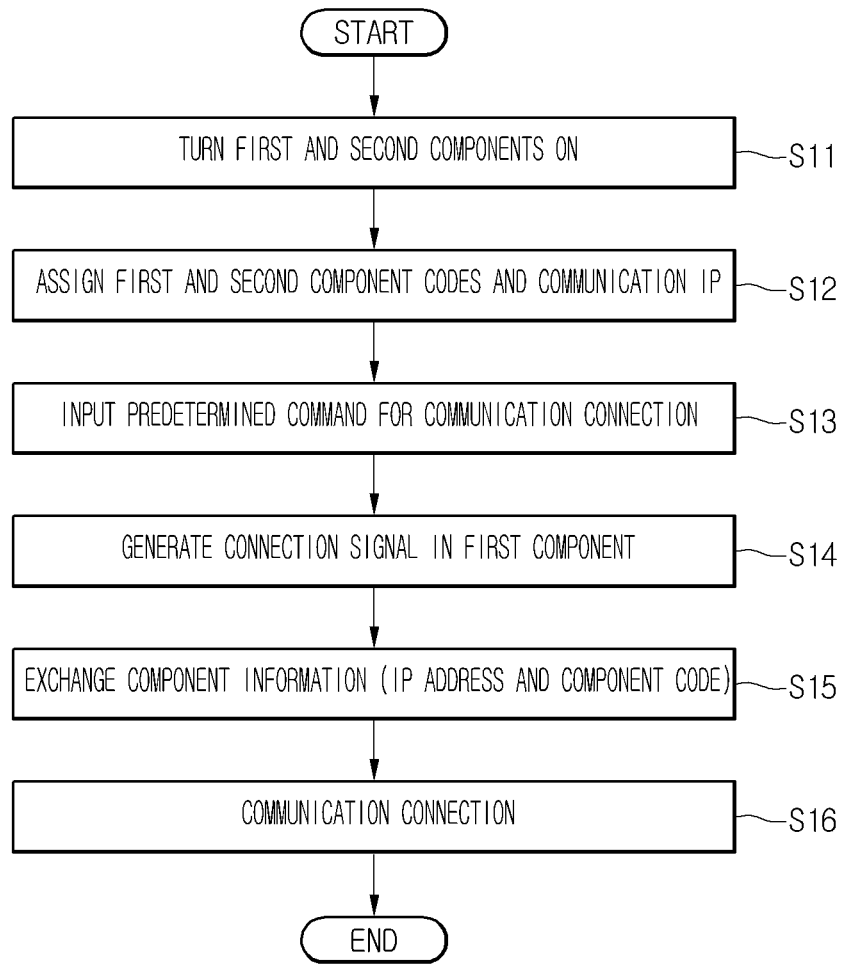
FIG. 3 is a flowchart illustrating a process of communicably connecting a plurality of components to each other according to the first embodiment of the present invention.

FIG. 3 is a flowchart illustrating a process of communicably connecting a plurality of components to each other according to the first embodiment of the present invention.

FIG. 3 illustrates a communication connection process between the plurality of components constituting the network system 10 according to the first embodiment. For example, communication for transmission/reception information between a first component and a second component may start.

Here, the first component may be the electric appliance 100, and the second component may be an external component 200.

When the first component is turned on, a device code (a first device code) of the first component is recognized in the first component. Then, an IP (communication address) of the first communication unit 110 may be assigned.

The device code may be a proper identification number (character) given when the first component is manufactured, installed, or sold. When the first component is turned on, information related to the device code may be transmitted to the first communication unit 110.

The IP may be set to a fixed IP or be a variable (changeable) IP used to communicate with the second component. Also, the IP may be assigned through a separate access point (AP) according to a communication method or may be assigned by self set of the first component. For example, the communication method may include Wifi, Bluetooth, or Zigbee.

Similarly, when the second component is turned on, a device code (a second device code) of the second component is recognized in the second component. Then, an IP (communication address) of the second communication unit 210 may be assigned (S11 and S12).

For communication between the first component and the second component, a predetermined command may be inputted into the first component or the second component. For example, a predetermined command may be inputted into the first component. The predetermined command may be inputted by manipulating a preset input unit or may be automatically recognized after the first component is turned on.

When the predetermined command is inputted, a connection sequence for connecting the second component may occur in the first component. The connection sequence of the first component may be transmitted to the second component (S14).

Also, information of the first component and information of the second component may be exchanged with each other. The information exchanged between the first component and the second component may include the IP address and the device code of respective components.

The first and second components may recognize or search an opponent component (device) to directly exchange the information therebetween. Also, the information may be exchanged via a specific server for storing information of the first or second component (S15).

As the information of the first component and the second component are exchanged with each other, the first and second components may be communicably connected to each other. When the first and second components communicate with each other, the information (data) may be transmitted/received therebetween (S16).

Figure 4:
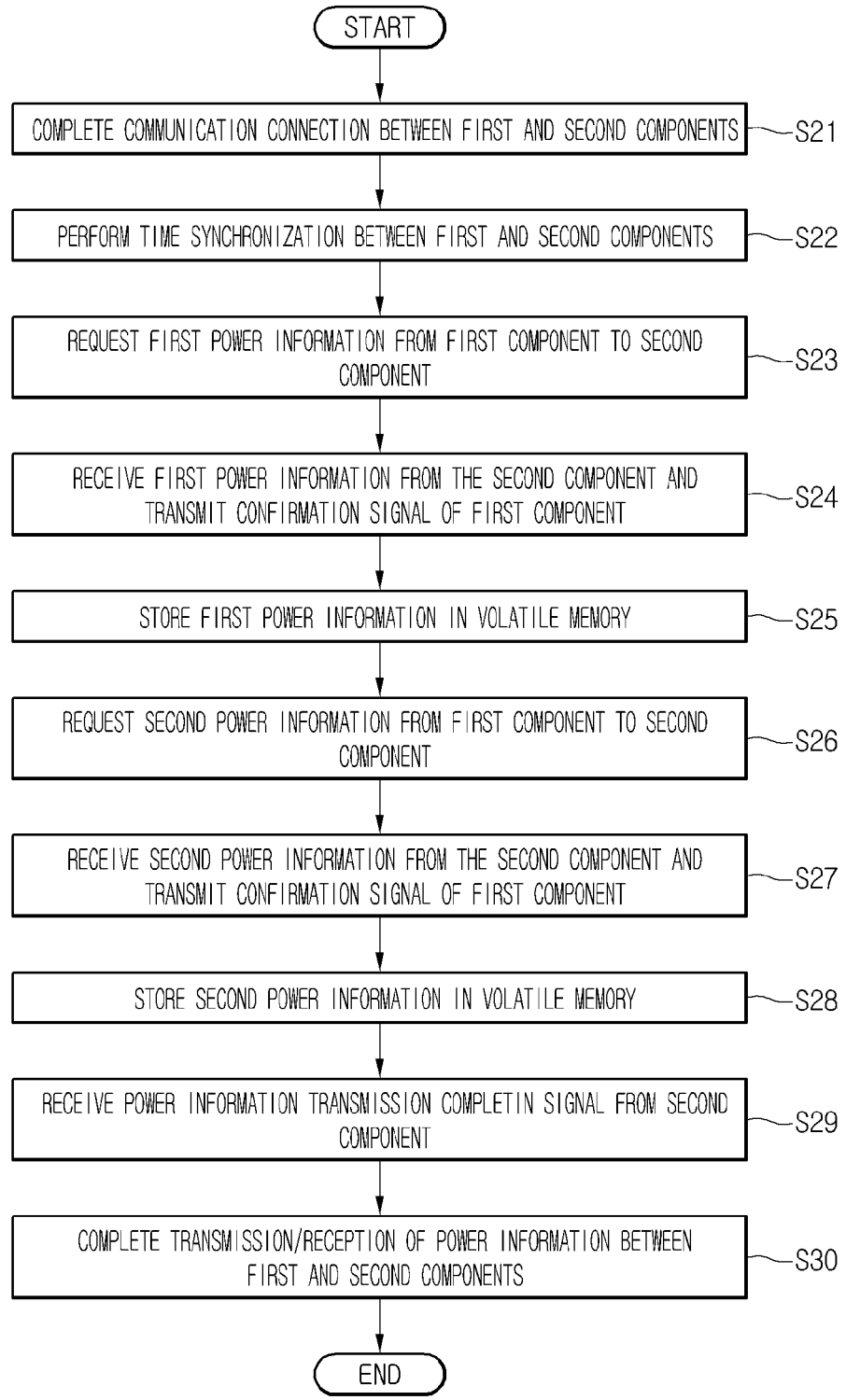
FIG. 4 is a flowchart illustrating a process of transmission/reception power information between the plurality of components according to the first embodiment of the present invention.

FIG. 4 is a flowchart illustrating a process of transmission/reception of power information between the plurality of components according to the first embodiment of the present invention.

When the communication connection between the first and second components described with reference to FIG. 3 is finished (S21), a time synchronization process between the first and second components is performed. The time synchronization process will be described below.

An operation time or method of the electric appliance may be determined based on the power information of the electric appliance. Here, the power information may include time information and charge information. For example, the electric appliance may be controlled so that the electric appliance operates in a time period in which the power charge is cheap.

For this, the time information including the power information may be required to be reflected to the first or second component. Here, a process of matching the time information of the first and second components may be understood as the "time synchronization process".

When the time information of the second component, i.e., the time information including the power information is different from that of the first component, the operation control of the component may be erroneously performed. For example, the component constituting the electric appliance may operate under a state in which the power charge is expensive.

Thus, first time information transmitted from the second component and second time information included in the first component may be compared to each other.

If the first time information is equal to the second time information, it may be determined or confirmed as a state in which the time synchronization is performed. On the other hand, if it is recognized that the first time information is not equal to the second time information, the second time information of the first component is changed into the first time information.

Also, the confirmation of the synchronized state or the result of the synchronized signal may be transmitted to the second component. As described above, since the time information of the first component is changed equal to the time information included in the power information, the control of the component on the basis of the power information may be easily performed (S22).

When the time synchronization is performed, the first component 100 requests first power information corresponding to the present time to the second component 200. Here, the first power information corresponding to the present time may be understood as power information applied when it is assumed that the electric appliance operates at present.

In general, since the user is interested in the power charge generated when the electric appliance immediately operates now, the first component 100 requests first the first power information corresponding to the present time (S23).

The second component 200 transmits the first power information of the power information to the first component 100. The first component 100 receives the first power information and transmits a confirmation signal for informing that the first power information has been received to the second component 200 (S24).

The first power information received by the first component 100 may be stored in the memory unit 140. In the current embodiment, the memory unit 140 may be a volatile memory in which the stored information is lost when the electric appliance 100 is turned off.

Thus, the information stored in the memory unit 140 may be lost when the electric appliance 100 is turned off. Then, when the electric appliance 100 is turned on, the memory unit 140 may newly receive and store power information from the second component 200 (S25).

Also, the first component 100 requests the second power information to the second component 200 after receiving the first power information. The second power information may be power information except for the first power information of the power information. That is, the second power information may be, for example, power information corresponding to a time period after the present time (S26).

The first component 100 may transmit a confirmation signal to the second component 200 when the second power information is received from the second component 200. Also, the received second power information may be stored in the memory unit 140 (S27 and S28).

Also, while the second power information is transmitted or received, the previously transmitted/received first power information may be transmitted or received together. Thus, while the second power information is transmitted or received, whether the change of the first power information occurred may be checked.

The transmission/reception of the first and second power information may be performed several times. Particularly, if the power information to be transmitted/received is large in capacity, the transmission/reception of the first or second power information may be performed several times.

Also, whether the transmission/reception of the power information is completed may be determined according to whether a power information transmission completion signal is received from the second component 200. After the transmission/reception of the second power information is performed at least one time, when the power information transmission completion signal is received by the first component 100, the transmission/reception between the first and second components may be completed (S29 and S30).

The first or second power information may include price identification (ID) information, a start time to which a price is applied, and a duration of the corresponding price. Here, the price may be understood as the power charge.

The price ID information may include names for identifying prices such as a first price, a second price, and a third price. The first, second, and third prices may have power charges different from each other.

Also, the price application start time may represent a start time at which the first, second, and third prices are applied. Also, the price duration time may represent a start time at which the first, second, or third price is continued. For example, the first price may have a start time (12:00 PM) and a duration (three and half hours), the second price may have a start time (15:30 PM) and a duration (five hours), and the third price may have a start time (20:30 PM) and a duration (four and half hours).

The first power information or the second power information may be tabled and transmitted to the first component 100.

When the first and second power information is transmitted to the electric appliance 100, the electric appliance 100 may perform a power-saving operation on the basis of the first and second power information to reduce the power charge or recommend one operation method with respect to the power-saving operation to the user.

Figure 5:
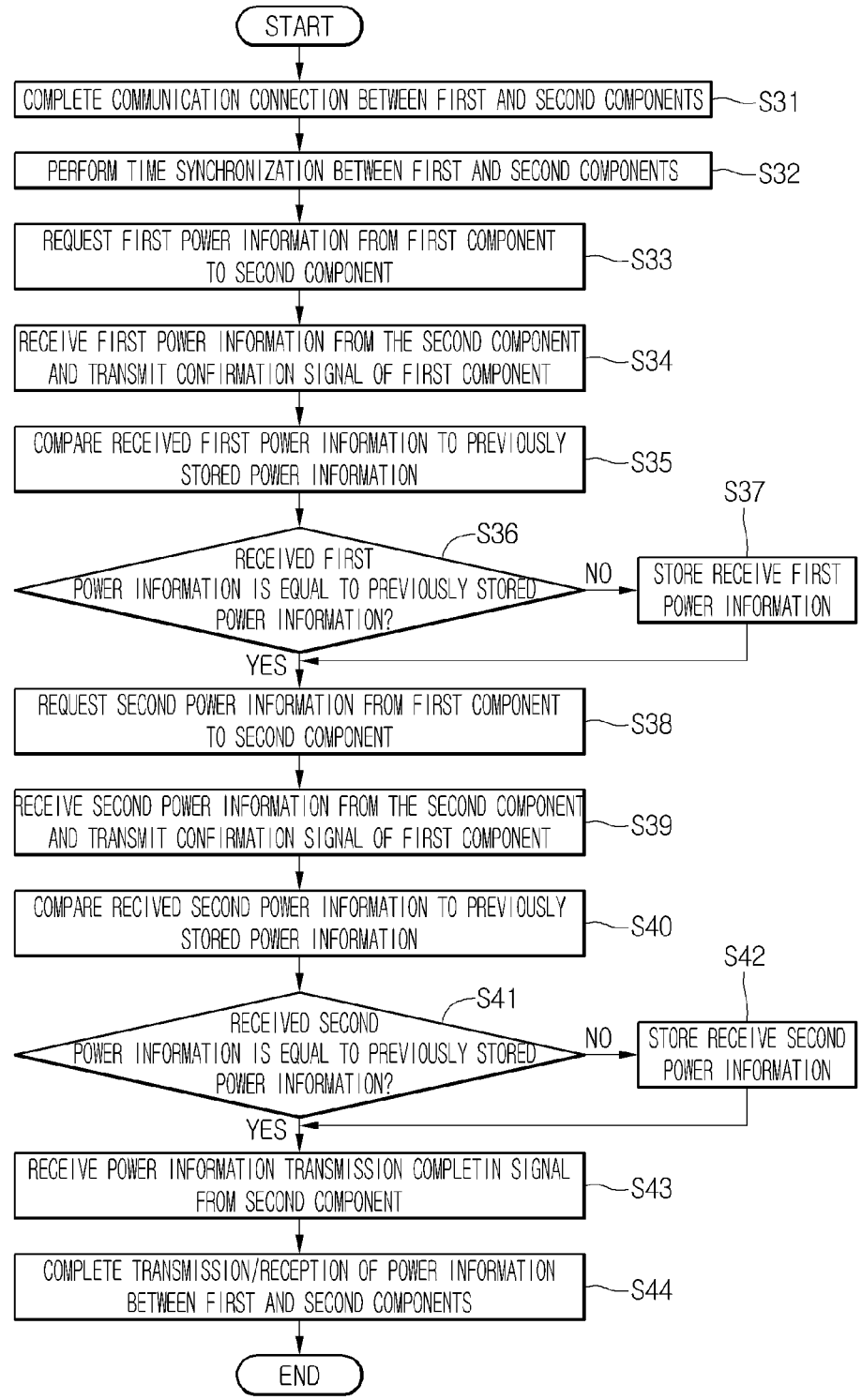
FIG. 5 is a flowchart illustrating a process of transmission/reception power information between a plurality of components according to a second embodiment of the present invention.

FIG. 5 is a flowchart illustrating a process of transmission/reception power information between a plurality of components according to a second embodiment of the present invention.

When communication connection between first and second components 100 and 200 is completed, time synchronization is performed. Also, the first component 100 requests first power information to the second component 200 to receive the first power information from the second component 200, thereby transmitting a confirmation signal to the second component 200. Since this is similar to that described in the first embodiment, their detailed description will be omitted (S31 to S34).

The first component 100 compares the received first power information with the power information previously stored in a memory unit 140. In the current embodiment, the memory unit 140 may be a nonvolatile memory in which the storage state of the information is maintained even though the electric appliance 100 is turned off.

That is, after the first component 100 is turned on, when the first power information is received from the second component 200, the first power information may be compared with the power information previously stored in the memory unit 140 (S35).

If the received first power information is equal to the previously stored power information (S36), post processes are performed. That is, the first component 100 receives request of a second power information from the second component 200 to transmit the confirmed signal.

As described above, the first power information may be understood as the power information corresponding to the present time, and the second power information may be understood as the power information except for the first power information, e.g., the power information corresponding to the time period after the present time (S38 and S39).

On the other hand, if the received first power information is not equal to the previously stored power information (S36), the received first power information is stored in the memory unit 140. That is, the power information stored in the memory unit 140 may be changed or updated into the first power information. Also, the above-described operations S38 and S39 may be performed (S37).

The first component 100 compares the received second power information to the power information previously stored in the memory unit 140 (S40).

If the received second power information is equal to the previously stored power information (S41), the transmission/reception of the second power information may be performed until a transmission/reception completion signal is received from the second component 200. When the transmission/reception completion signal is received, the transmission/reception of the power information between the first and second components 100 and 200 may be completed (S43 and S44).

On the other hand, if the received second power information is not equal to the previously stored power information (S41), the received second power information is stored in the memory unit 140. That is, the power information stored in the memory unit 140 may be changed or updated into the second power information. Also, the above-described operations S43 and S44 may be performed (S42).

Figure 6:
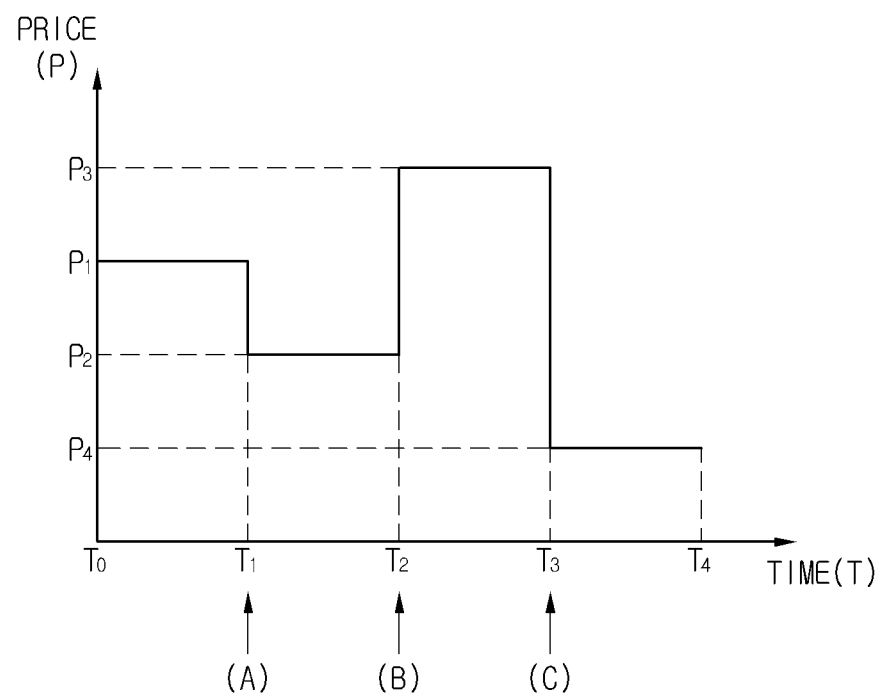
FIG. 6 is a graph illustrating a request state of power information according to an embodiment.

FIG. 6 is a graph illustrating a request state of power information according to an embodiment.

FIG. 6 illustrates power information, i.e., a variation with respect to a power price according to time. The variation with respect to the power price according to time will be described.

Here, an X-axis value represents a time elapsing from a present time T0 used as a time point, and a Y-axis value represents a power price.

The first power information corresponding to the present time T0 may be defined as price ID information (a first price P1), a start time T0, and a duration T1 to T0.

Also, the second power information except for the first power information, e.g., the power information corresponding to the time period after the present time T0 may include following detailed information in a Table.

1. Price ID information (a second price P2), a start time T1, and a duration T2 to T1.
2. Price ID information (a third price P3), a start time T3, and a duration T3 to T2.
3. Price ID information (a fourth price P4), a start time T3, and a duration T4 to T3.

As described above, a plurality of time points at which the power price is changed exist in the power information. In detail, the price is changed at times T1, T2, and T3.

If a price of the supplied electricity is changed, the corresponding price changing time (hereinafter, referred to as a price changing time) may be a factor for controlling the operation of the electric appliance 100. Thus, in the current embodiment, the first component, i.e., the electric appliance 100 may request the power information to the second component 200 at the price changing time.

That is, the electric appliance 100 may request the power information at boundary times (A), (B), and (C) in FIG. 6. For example, a time at which the electric appliance 100 requests the power information may be the boundary times (A), (B), and (C) or may be times before or after a preset time from the boundary times (A), (B), and (C).

Therefore, the electric appliance 100 may be controlled on the basis of accurate power information to effectively prevent the electric appliance 100 from operating in an undesired price period due to user's erroneous power information.

Figure 7:
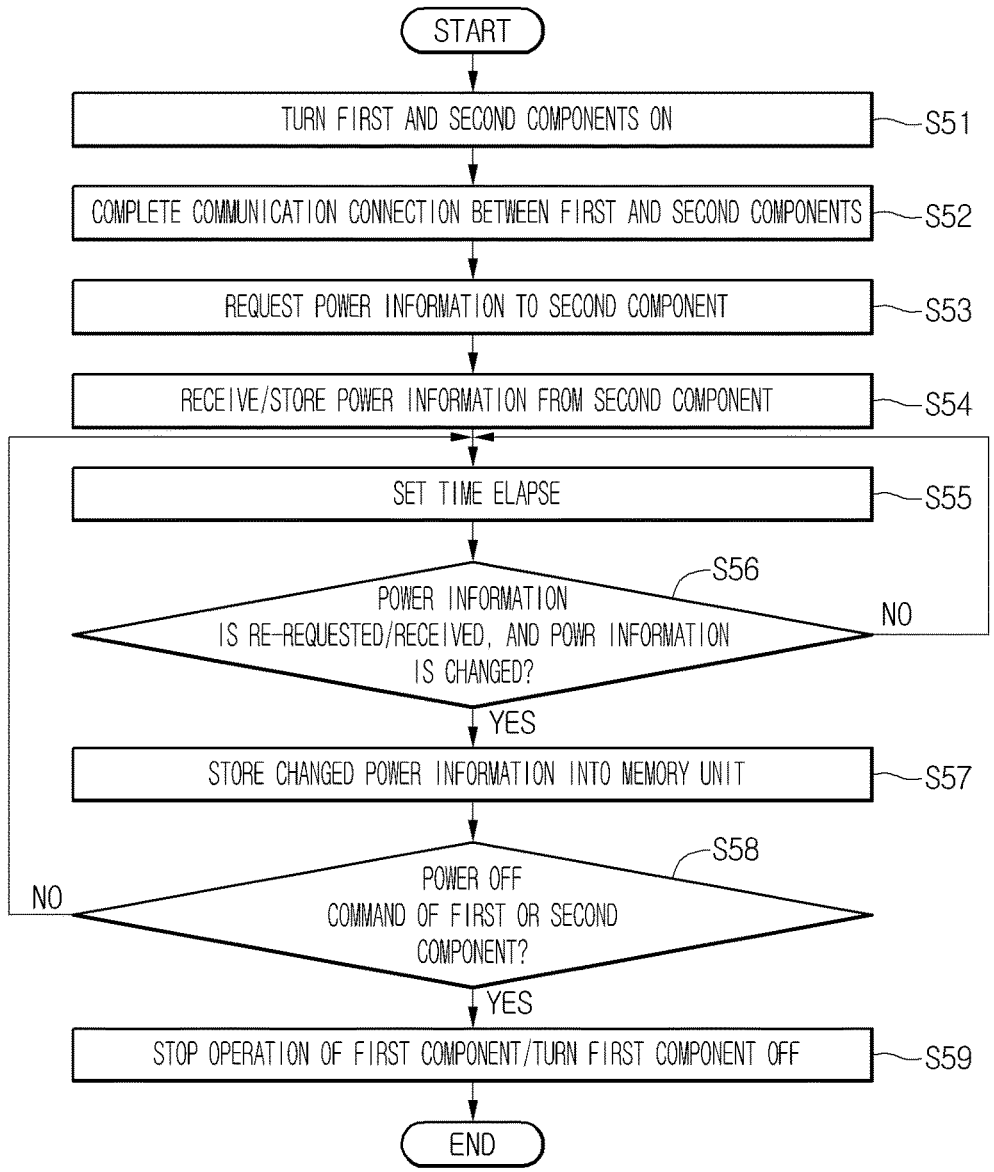
FIG. 7 is a flowchart illustrating a process of transmission/reception power information between a plurality of components according to a third embodiment of the present invention.

FIG. 7 is a flowchart illustrating a process of transmitting/receiving power information between a plurality of components according to a third embodiment of the present invention.

Referring to FIG. 7, an embodiment in which a first component is controlled to periodically confirm power information will be described below.

In detail, when first and second components are turned on to communicate with each other, the first component 100 requests power information to the second component 200. When the power information is received from the second component 200, the first component stores the power information and transmits a confirmation signal to the second component (S51 to S54).

When a set time elapses (S55), the first component 100 may request the power information again to the second component to receive the power information.

Also, whether the newly received power information is changed from the previously received power information may be recognized. If the newly received power information is changed, the changed power information is stored in a memory unit 140 of the first component 100 (S56 and S57). On the other hand, if the power information has not changed, operations followed by the operation S55 may be repeatedly performed. Here, the change of the power information may include one of a power price, a start time, and a duration.

The operations S55 to S57 may be performed until an OFF command with respect to the first and second component 100 or 200 is recognized (S58 and S59).

As described above, since the request and the reception of the power information is performed according to a preset period, an electric appliance may be periodically updated with accurate power information.

Another embodiment will be proposed.

In the first and second embodiments, the first component requests and receives the first power information, and the received and confirmed signal is transmitted to the second component. Then, the request of the second power information is performed (successive transmission/reception).

However, unlike the first and second embodiments, the first power information may be transmitted and received, and immediately, the second power information may be transmitted and received without performing the separate processes such as the request, reception, and confirmed signal transmission of the first and second power information. Also, when the transmission/reception of the second power information is completed, the second component may transmit the transmitted signal of the power information to the first component.

Further another embodiment will now be described.

In FIG. 6, power information is requested at a time in which the power information is changed. In FIG. 7, power information is periodically requested.

On the other hand, when at least one portion of the power information, i.e., the power price, the start time, or the duration is changed, the second component may transmit the changed power information to the first component without a request from the first component.

Figure 8:
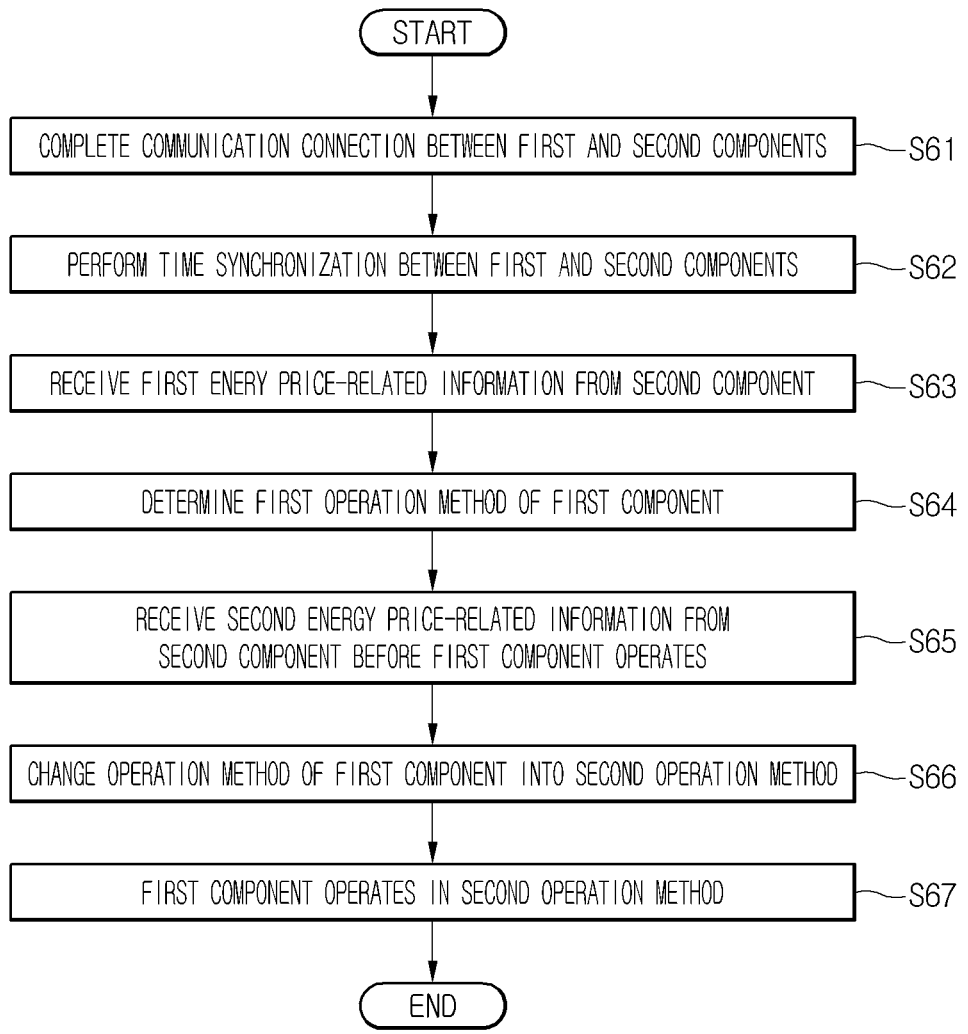
FIG. 8 is a flowchart illustrating a method of controlling an electric appliance according to a fourth embodiment.

FIG. 8 is a flowchart illustrating a method of controlling an electric appliance according to a fourth embodiment. For example, an electric appliance according to the current embodiment may include a constantly operating product, e.g., a refrigerator, water purifier and etc.

When the communication connection between the first and second components described with reference to FIG. 3 is finished (S61), a time synchronization process between the first and second components is performed (S62).

When the time synchronization is performed, the first component 100 may receive first information (hereinafter, referred to as first energy change-related information) with respect to an energy price from the second component 200. The first energy price-related information includes time information and price-related information.

That is, the first energy price-related information may be power information. The power information may be provided to the first component 100 at a predetermined period, for example, for daily, weekly, and monthly unit. Particularly, power information with respect to a future time period on the basis of a present time may be provided to the electric appliance.

For example, the first energy price-related information may include at least one of high-price information and low-price information.

The high-price information may be understood as information in which an energy price is relatively expensive. The high-price information may include first price information and a first demand response signal.

The first price information includes on-peak information. The on-peak information may be information that is recognized when an energy price is greater than a reference value. Also, the first demand response signal may include curtailment information and supply power leakage information.

The curtailment information may be understood as information for requesting reduction in use of energy. For example, the curtailment information may be information with respect to an operation method in which an operation of the first component is stopped, or a little power is used.

The supply power leakage information may be understood as a case in which a frequency less than a reference frequency of an AC power supplied to the first component 100 is detected, for example, information in which an amount of electricity to be supplied from a power company to a place of use leaks.

The low-price information may be understood as information in which an energy charge is relatively inexpensive. The low-price information may include second price information and a second demand response signal.

The second price information includes off-peak information. The off-peak information may be information that is recognized when the energy price is less than the reference value. Also, the second demand response signal may include energy increase information and excessive supply power information.

The energy increase information represents information in which an increase in energy use is allowable, for example, a state in which surplus electricity occurs because an amount of electricity used in the component is less than an amount of generated electricity.

The excessive supply power information may be understood as a case in which a frequency greater than the reference frequency of the AC power supplied to the first component 100 is detected, for example, information in which an amount of electricity to be supplied from the power company to the place of use leaks.

When the first component 100 receives the first energy price-related information, the operation method of the first component 100 may be determined according to a first operation method corresponding to the first energy price-related information.

For example, when the first energy price-related information is the high-price information, the first operation method may be a "power-saving mode". The power-saving mode may be understood as a mode in which the operation of the first component 100 is controlled on the basis of the first energy price-related information.

Also, a "normal mode" different from the power-saving mode may be defined. The normal mode may be understood as a mode in which the first component 100 is controlled without being based on the first energy price-related information.

Here, the term "mode" may be understood as the concept which includes a specific component constituting the first component 100 or a specific operation course with respect to a function to be performed by the first component 100.

When the power-saving mode is performed, the first component 100 may be controlled so that energy usage amount or energy price when the first component 100 is controlled on the basis of the first energy price-related information is less than that when the first component 100 is controlled without being based on the first energy price-related information (i.e., the first component 100 is controlled in the normal mode).

For example, when the power-saving mode is performed, the operation time of the first component 100 may be shifted to a time period in which the low-price information is applied or may adjust an output of the first component to reduce the energy price.

For another example, when the power-saving mode is performed, at least one component of a plurality of components constituting the first component 100 is restricted in operation, or at least one course of a plurality of courses constituting the first component 100 may be restricted. Here, the term "restriction" may represent function performance stop, function performance delay, or output reduction (including turn-off of the output).

For further example, when the first component 100 operates in the power-saving mode, a time period in which the energy price is relatively inexpensive in a time period from the present time to a predetermined time, i.e., an optimal operation time may be recommended, or an optimal course in which the energy price is inexpensive in an operable course may be recommended on the basis of the first energy price-related information.

When the first component 100 is performed in the power-saving mode, the energy price may be reduced. However, the function performance of the first component 100 may also be reduced.

When the first energy price-related information is the low-price information, the first operation method may be the "normal mode".

When the normal mode is performed, the first component 100 may operate on the basis of information recognized by the first component 100 by itself without taking into consideration of the first energy price-related information, for example, information inputted through the first input unit 130 by a user (S64).

The external component 200 may change the energy price-related information according to an amount of suppliable (producible) electricity or a power usage amount in the place of use to supply the electricity. In detail, when a difference between an estimated power demand in the whole used places (homes or companies) receiving the electricity produced by the energy generation unit and an actual power demand in the whole used places occurs, the external component 200 may change the energy price-related information and provide the changed information to the electric appliance.

That is, even though the energy price-related information with respect to a specific time period is provided to the electric appliance, the energy price-related information with the corresponding time period may be changed according to the suppliable power amount or the power usage amount in the place of use.

As described above, when the energy price-related information is changed before the first component 100 operates, the first component 100 may receive second information (hereinafter, referred to as second energy price-related information) with respect to the energy price from the second component 200.

The second energy price-related information includes time information and price-related information as information changed from the first energy price-related information.

A process in which the first energy price-related information is changed into the second energy price-related information will be described below with reference to FIGS. 9 to 12 (S65).

When the second energy price-related information is recognized, the first component 100 may change in operation into the second operation method corresponding to the second energy price-related information. Also, the first component 100 may operate in the second operation method (S66 and S67).

For example, when the first energy price-related information is the high-price information, the first operation method may be the "power-saving mode". Also, when the second energy price-related information is the low-price information, the second operation method may be the "normal mode".

Also, when the content of the power-saving mode is the shift of the operation time period of the first component 100 or the component constituting the first component 100, the power-saving mode may be called off the shift so that the first component 100 or the component constituting the first component 100 operates in its original operation time period, e.g., normal mode.

For example, assuming that the first component 100 is the refrigerator, an operation time of a defrosting heater of the refrigerator is scheduled from about 14:00 to about 14:20 in the normal mode.

Also, if it is recognized that the high-price time period may be in a range of a time period from about 14:00 to about 16:00 from the first energy price-related information (the high-price information), the first operation method (the power-saving mode) avoids the high-price time period to determine that the defrosting heater operates in a range of a time period from about 16:00 to about 16:20.

However, when the first energy price-related information (the high-price information) is changed into the second energy price-related information (the low-price information) at a time point at which the defrosting heater of the refrigerator operates in the normal mode or the power-saving mode, i.e., before a time of about 14:00, the refrigerator may operate in the second operation method (the normal mode) changed from the first operation method. Thus, the defrosting heater of the refrigerator may operate again at a time period of about 14:00 to about 14:20.

As described above, the operation method (the operation of the defrosting heater for about 20 minutes) of the refrigerator are the same in the normal or power-saving modes, but shifted in the operation time (the time period).

It will be assumed that the case is reversed.

When the first energy price-related information is the low-price information, and the second energy price-related information is the high-price information, it may be determined that the first operation method may be the normal mode, and the defrosting heater may operate for an operation time of about 14:00 to about 14:20, and also, the second operation method may be the power-saving mode, and the defrosting heater may be changed to operate for an operation time of about 16:00 to about 16:20.

For another example, the content of the power-saving mode is the restriction of the operation of the first component 100 or a sub-component constituting the first component 100, at least one of the first energy price-related information and the second energy price-related information is the high-price information, the first component may operate in the power-saving mode so that the operation of the first component is relatively restricted than that in the normal mode. Here, the term "restriction" may be understood as, for example, the reduction of the output or operation time.

For example, the defrosting heater of the refrigerator may operate at an output of about 60 W in the normal mode and at an output of about 30 W in the power-saving mode. That is, the operation method of the first component may be different in the normal or power-saving modes.

The process in which the first energy price-related information is changed into the second energy price-related information may be the shift of the high-price or low-price time period or the cancellation of the high-price or low-price time period. Hereinafter, the above-described process will be described with reference to the accompanying drawings.

FIGS. 9(*a*), 9(*b*), 10(*a*) and 10(*b*) are graphs illustrating an energy information change according to the fourth embodiment.

FIG. 9A illustrates first energy price-related information, and FIG. 9B illustrates second energy price-related information. Here, the first and second energy price-related information may represent a demand response signal. Also, an X-axis represents a time value, and a Y-axis represents a signal ON/OFF value.

In detail, according to the first energy price-related information, the demand response signal is turned on in a time period of T1 to T2 and turned off in a time period after the time T2.

In the above-described demand response signal, when the demand response signal illustrated in FIG. 9A is curtailment information of high-price information, a first component 100 may perform a power-saving mode in a first operation method in a time period of T1 to T2 at which the curtailment information is turned on.

Also, the first component 100 may perform a normal mode in the first operation method in a time period of T0 to T1 at which the curtailment information is turned off and a time period after the time T2.

However, before a start time T1 in the power-saving mode, i.e., before the first component 100 performs the power-saving mode, the first energy price-related information may be changed into second energy price-related information of FIG. 9B. The second energy price-related information may be understood as information in which a time period in which the curtailment information is turned on/off is changed.

That is, a time period in which the curtailment information is turned on is changed into a time period of T1' to T2'. Also, a time period in which the curtailment information is turned off is changed into a time period of T0 to T1' and a time period after the time T2'.

Thus, the first component 100 may be performed in the same operation method as that in the power-saving mode at a time period of T1' to T2', and may be performed in the same operation method as that in the normal mode at a time period of T0 to T1' and a time period after the time T2' (second operation method).

As described above, when the shift of the time information of the first energy price-related information occurs, the operation method may be equally maintained, but the operation time period may be shifted.

FIG. 10A illustrates first energy price-related information, and FIG. 10B illustrates second energy price-related information. Here, the first and second energy price-related information may represent the price information. Also, an X-axis represents a time value, and a Y-axis represents a price-related signal.

In detail, a price greater than a reference value Po may be understood as on-peak information, a price less than the reference value Po may be understood as off-peak information.

As shown in FIG. 10A, when the first energy price-related information is received, the first energy price-related information may include the on-peak information and the off-peak information.

In detail, in the on-peak information, an energy price in a time period of T0 to T1 may be a price P1, and an energy price in a time period of T2 to T3 may be a price P3. In detail, in the off-peak information, an energy price in a time period of T1 to T2 may be a price P2, and an energy price in a time period after the time T3 may be a price P4.

Thus, the first operation method of the first component may be a power-saving mode in a time period at which the on-peak information arrives and a normal mode in a time period at which the off-peak information arrives.

Before the first component 100 performs the above-described power-saving or normal modes, second energy price-related information may be received. The second energy price-related information may be understood that the time information of the first energy price-related information is shifted.

The first component 100 may operate in a second operation method to corresponding to the second energy price-related information. In the second operation method, the power-saving mode is performed in a time period of T0 to T1, and the normal mode is performed in a time period of T1' to T2'.

As described above, when the second energy price-related information corresponds that the time information of the first energy price-related information is shifted, a corresponding mode operation time of the first component 100 may also be shifted.

FIGS. 11(a), 11(b), 12(a) and 12(b) are graphs illustrating an energy information change according to a fifth embodiment.

FIG. 11A illustrates first energy price-related information, and FIG. 11B illustrates second energy price-related information. Here, the first and second energy price-related information may represent a demand response signal. Also, an X-axis represents a time value, and a Y-axis represents a signal ON/OFF value.

In detail, according to the first energy price-related information, the demand response signal is turned on in a time period of T1 to T2 and turned off in a time period after the time T2.

In the above-described demand response signal, when the demand response signal illustrated in FIG. 11A is curtailment information of high-price information, a first component 100 may perform a power-saving mode in a first operation method in a time period of T1 to T2 at which the curtailment information is turned on.

Also, the first component 100 may perform a normal mode in the first operation method in a time period of T0 to T1 at which the curtailment information is turned off and a time period after the time T2.

However, before a start time T1 in the power-saving mode, i.e., before the first component 100 performs the power-saving mode, the first energy price-related information may be changed into second energy price-related information of FIG. 11B.

The second energy price-related information may be understood as information in which a time period in which the curtailment information is turned on is cancelled. That is, a time period in which the curtailment information is turned on does not exist. Thus, the first component 100 may perform the normal mode in the time period of T0 to T2 (a second operation method).

As described above, when the first energy price-related information is cancelled, the first component 100 may perform the second operation method different from the first operation method.

That is, when the energy price-related information is cancelled, the first component 100 may perform the normal mode to prevent the first component 100 from being deteriorated in function performance if the power-saving mode is performed.

FIG. 12A illustrates first energy price-related information, and FIG. 12B illustrates second energy price-related information. Here, the first and second energy price-related information may represent the price information. Also, an X-axis represents a time value, and a Y-axis represents a price-related signal.

In detail, a price greater than a reference value Po may be understood as on-peak information, a price less than the reference value Po may be understood as off-peak information.

As shown in FIG. 12A, when the first energy price-related information is received, the first energy price-related information may include the on-peak information and the off-peak information.

In detail, in the on-peak information, an energy price in a time period of T0 to T1 may be a price P1, and an energy price in a time period of T2 to T3 may be a price P3. In detail, in the off-peak information, an energy price in a time period of T1 to T2 may be a price P2, and an energy price in a time period after the time T3 may be a price P4.

Thus, the first operation method of the first component may be a power-saving mode in a time period at which the on-peak information arrives and a normal mode in a time period at which the off-peak information arrives.

Before the first component 100 performs the above-described power-saving or normal modes, second energy price-related information may be received. The second energy price-related information may be understood that the on-peak information of the first energy price-related information is cancelled.

The process in which the on-peak information is cancelled may occur when an actual power demand is less by a preset value or more than that of an estimated power demand, i.e., it is unnecessary to increase the energy price.

The first component 100 may operate in a second operation method corresponding to the second energy price-related information. That is, the second operation method may operate in the normal mode in the whole time period of T0 to T3.

As described above, when the second energy price-related information indicates that specific price information of the first energy price-related information is cancelled, the operation method of the first component 100 may be variable.

Although the second energy price-related information is shown as only the first energy price-related information in which the on-peak information is cancelled in FIG. 12(b), the present disclosure is not limited thereto. For example, as the off-peak information is cancelled, the second operation method may be determined so that the whole time period of T0 to T3 operates in the power-saving mode.

Here, the process in which the on-peak information is cancelled may occur when an actual power demand is greater than or less by a preset value than that of an estimated power demand, i.e., it is necessary to increase the energy price.

As described above, since the operation method of the electric appliance may be determined to correspond to the change of the second energy price-related information, the electric appliance may effectively operate.

Figure 13:
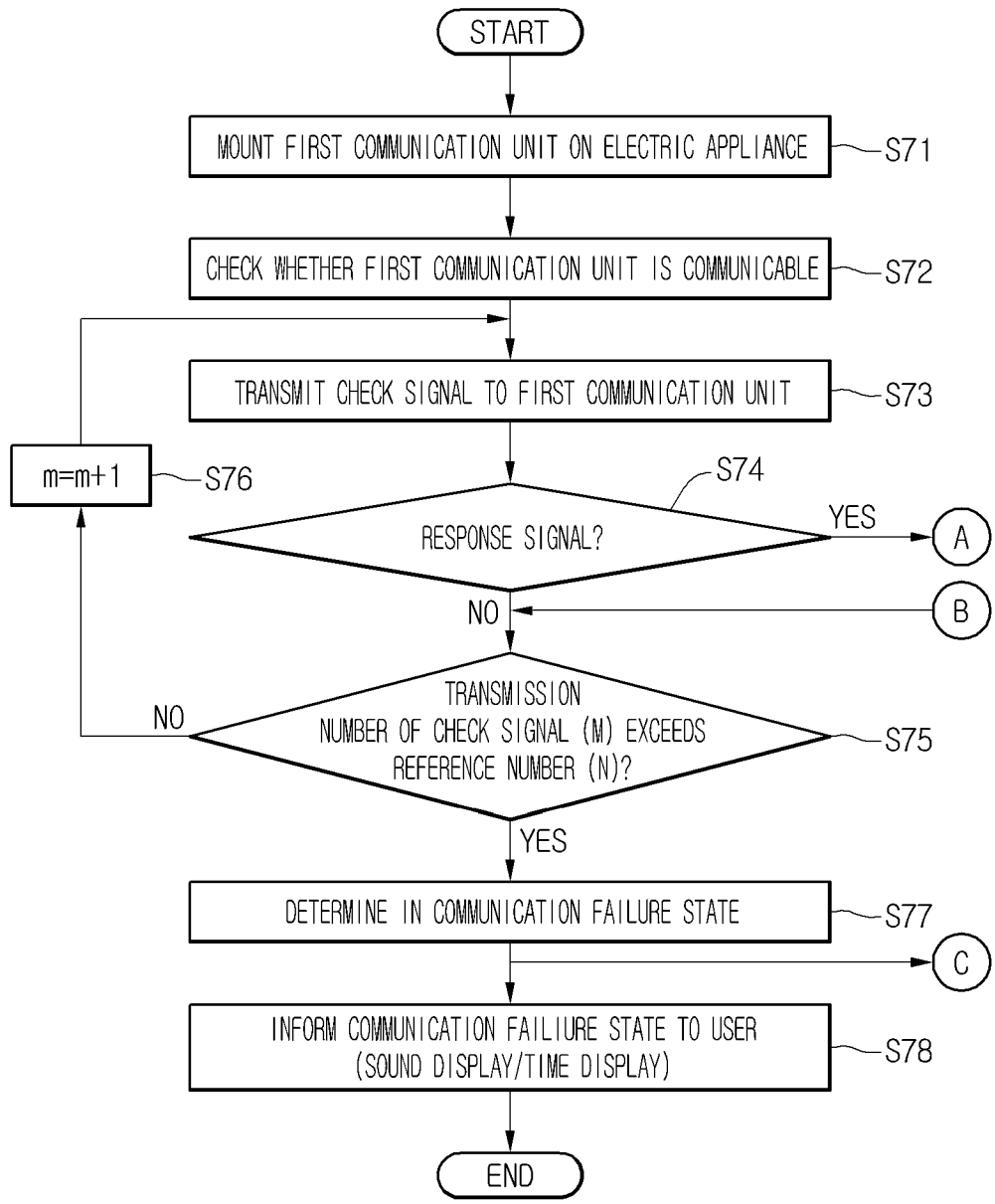
FIGS. 13 to 15 are flowcharts illustrating a control method related to a communication failure of an electric appliance according to a sixth embodiment.
Figure 14:
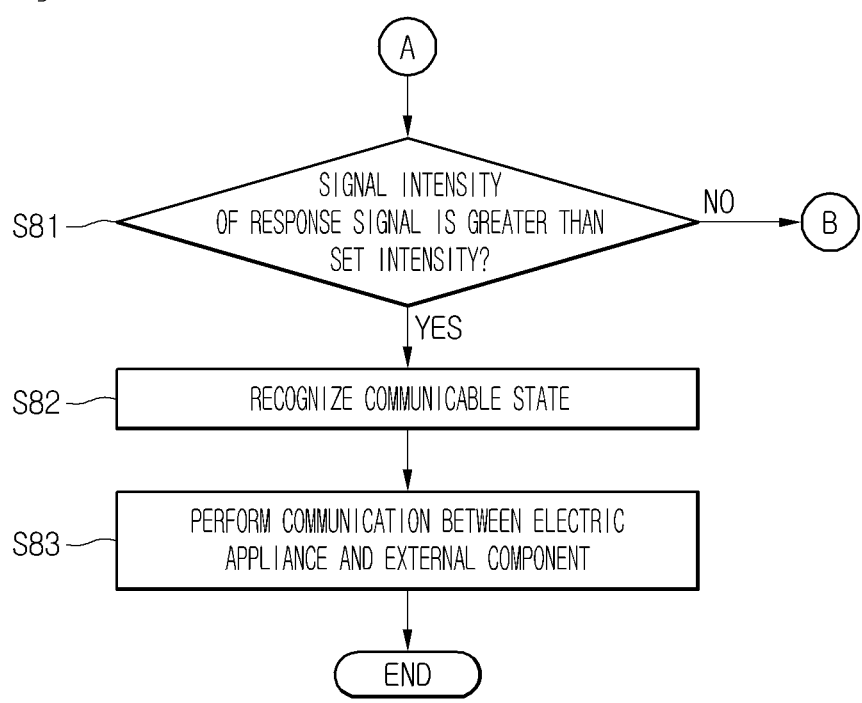
Figure 15:
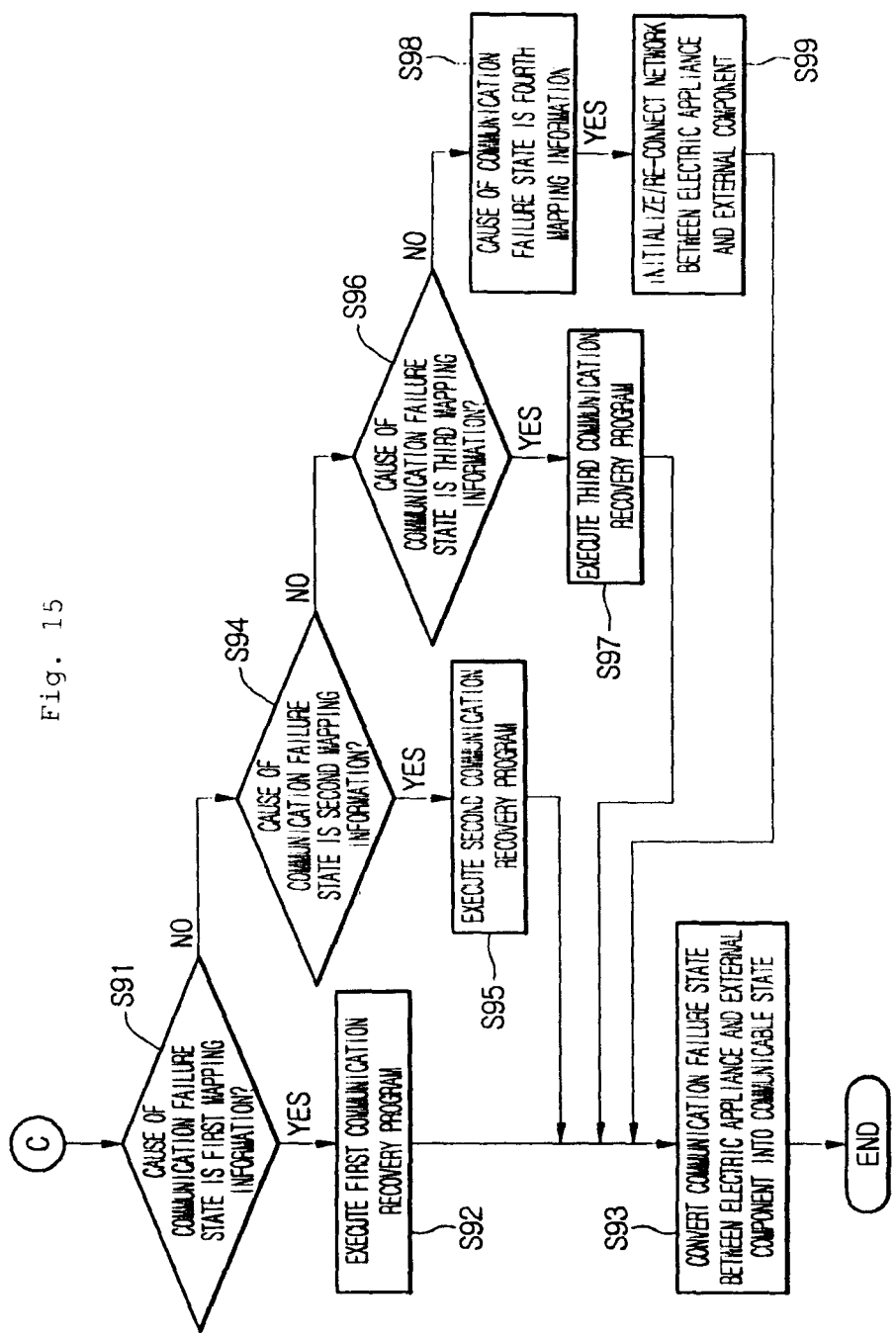

FIGS. 13 to 15 are flowcharts illustrating a control method related to a communication failure of an electric appliance according to a sixth embodiment. A method of controlling an electric appliance according to a sixth embodiment will be described with reference to FIGS. 13 to 15.

When a first communication unit 110 is mounted on an electric appliance 100 (S71), whether the first communication unit 110 is mounted or communicable is checked (S72). A check signal is transmitted from a second communication unit 210 of an external component 200 to the first communication unit 110 (S73).

Thereafter, whether a response signal is transmitted from the first communication unit 110 is recognized with respect to the transmitted check signal (S74). Alternatively, the check signal may be transmitted from the first communication unit 110, and the response signal may be transmitted from the second communication unit 210.

If there is no response signal, it is determined first whether a check signal transmission number m exceeds a predetermined reference number n (S75).

This is done for determining whether the communication is enabled by transmitting the check signal several times because the determination of the communicable state of the first communication unit 110 may have a limitation in reliability if the check signal is transmitted only once. It may be determined that the first communication unit 110 is in communication failure state if the second communication unit 210 does not respond even though the check signal has been transmitted several times.

If the transmission number m of the check signal does not exceed the reference number n in a state where there is no response signal, the transmission number m may be incremented, and then, the check signal may be transmitted again (S76 and S73). If the transmission number m of the check signal exceeds the reference number n in the state where there is no response signal, it may be finally recognized that the first communication unit 110 is in the communication failure state (S77).

Also, the communication failure state may be displayed on the external component 200 or the electric appliance 100 so that a user quickly and easily recognizes the communication failure state of the first communication unit 110 (S78). Here, the communication failure state may be visibly displayed as well as being audible by using an alarm sound.

Although whether the first communication unit 110 is communicable is determined on the basis of the transmission number m of the check signal in FIG. 13, the present disclosure is not limited thereto. For example, whether the first communication unit 110 is communicable may be determined on the basis of a transmission time of the check signal.

That is, if the check signal is continuously transmitted, and the transmission time is greater than a preset time, it may be determined that the first communication unit 110 is in the communication failure state. For example, the preset time may be about 20 seconds.

If there is a response signal with respect to the check signal in operation S74, it may be recognized whether the intensity of the response signal is greater than the preset intensity (S81).

If the signal intensity is greater than the preset intensity, it may be recognized that communication between the first communication unit 110 and the second communication unit 210 is enabled. Thus, the communication between the electric appliance 100 and the external component 200 may be performed (S82 and S83).

As described above, even though the response signal with respect to the check signal is detected, if the signal intensity is week to restrict smooth communication, it may be regarded as if there is no response signal. Thus, it may be controlled to transmit the check signal again once. As a result, it may be recognized as the communicable state when the response signal is received with the intensity greater than a predetermined intensity.

When the communication failure state is recognized in the operation S77, causes of the communication failure may be recognized by using a plurality of previously stored mapping information. Then, a solution method corresponding to the communication failure may be proposed.

In detail, a plurality of mapping information that may be the causes of the communication failure when the communication between the electric appliance 100 and the external component 200 has failed may be stored in the memory unit (see reference numeral 140 of FIG. 2) of the electric appliance 100 or a memory unit 240 of the external component 200. Hereinafter, a case in which the plurality of mapping information are stored in the memory unit 140 of the electric appliance 100 will be described an example.

The plurality of mapping information stored in the memory unit 140 will be described with reference to following Table.

| Classification | Communication failure cause |
| --- | --- |
| First mapping information | Change of network key of server in a state where network key update message is not received |

-continued

| Classification | Communication failure cause |
|---|---|
| Second mapping information | Change of channel of external component in a state where channel change message is not received |
| Third mapping information | External component is turned off |
| Fourth mapping information | New network establish of external component |

When it is determined that the communication between the electric appliance 100 and the external component 200 has failed after the communication connection is performed according to a predetermined procedure, the mapping information stored in the memory unit 140 is checked.

The mapping information includes first mapping information in which a key of the communication network constructed between the electric appliance 100 and the external component 200 is changed, as one cause of the communication failure state.

Here, the key of the network may be understood as a security code that is necessary to connect the external component 200 to the electric component 100. Also, the electric appliance 100 may transmit information with respect to the key of the network to the external component 200 at an initial communication connection stage and thus may be linked to the network.

When the network key information provided from the external component 200 does not accord with network key information recognized by the electric appliance 100, a control unit 250 of the external component 200 or the product control unit 150 may recognize the link failure of the electric appliance 100.

If the external component 200 and the plurality of electric appliance are connected to each other to constitute one network, the external component 200 and the plurality of electric appliances 100 may share one network key.

Also, the network key may be updated or changed periodically or according to a predetermined condition. The updated or changed network key may be transmitted from the external component 200 to the electric appliance 100.

However, when the external component 200 changes the network key in the state where the transmission of the updated or changed network key has failed, the electric appliance 100 and the external component 200 may be in the communication failure state therebetween. The information in which the communication failure state is defined due to the above-described cause may be the first mapping information.

The mapping information includes second mapping information in which a communication channel used for the communication between the electric appliance 100 and the external component 200 is changed, as the other cause of the communication failure state.

Here, a channel used for the communication between the electric appliance 100 and the external component 200 may be provided in plurality. The plurality of channels may be classified according to frequencies. That is, the plurality of channels having frequencies different from each other may be provided.

Even though the electric appliance 100 and the external component 200 communicate with each other by using one channel, interference between the plurality of channels may occur during the communication. In this case, it may be necessary to change the channel interfering therebetween into the other channel having good communication quality. Here, a channel change message may be transmitted to the electric appliance 100 from the external component 200.

However, in a state where the transmission of the channel change message has failed, when the channel of the external component 200 is changed, the electric appliance 100 and the external component 200 may be in the communication failure state therebetween. The information in which the communication failure state is defined due to the above-described cause may be the second mapping information.

When the channel information provided from the external component 200 does not accord with channel information recognized by the electric appliance 100, the control unit 250 of the external component 200 or the product control unit 150 may recognize the sharing failure of the channel information of the electric appliance 100.

The mapping information may include third mapping information in which that unexpected problems may suddenly occur to turn the external component 200 or the electric appliance 100 off. The unexpected problems may include an emergency situation such as a blackout or breakdown state.

The mapping information may include fourth mapping information in which the external component 200 deletes the existing network to establish new network. That is, when the fourth mapping information is recognized as the cause of the communication failure, it may be determined that the electric appliance 100 has withdrawn from the network.

For example, when the user makes the move to a new house, and thus the electric appliance 100 is communicably connected to a network depending on the new external network 200, the fourth mapping information may be recognized.

In case of the communication failure state according to the first to third mapping information, a recovery program provided in the electric appliance 100 or the external component 200 may be executed to convert the communication failure state into a communicable state. The recovery program may be stored in the memory unit 140 of the electric appliance 100 or the memory unit 240 of the external component 200. Alternatively, the recovery program may be stored in all of the memory units 140 and 240.

On the other hand, in case of the communication failure state according to the fourth mapping information, the problem solution using the recovery program itself may be restricted. Thus, the communication between the electric appliance 100 and the external component 200 may be initialized, and then new network connection may be attempted.

A process of executing the recovery program and initializing the network connection on the basis of the mapping information with respect to the communication failure state will be described with reference to FIG. 15.

Referring to FIG. 15, if the communication failure state is recognized, it is recognized whether a cause of the communication failure state corresponds to the first mapping information. Whether the cause corresponds to the first mapping information may be determined as the control unit 250 of the external component 200 or the product control unit 150 recognizes that the electric appliance 100 is not linked to the network (S91).

If the cause of the communication failure state corresponds to the first mapping information, first communication recovery program is executed. The first communication recovery program transmits a network key update message to the electric appliance 100, and then, the electric appliance 100 transmits a confirmation signal with respect to the transmission of the network key update message to the external component 200 (S92).

When the confirmation signal is received by the external component 200, the electric appliance 100 and the external component 200 may be converted into a communicable state therebetween (S93).

In the operation S91, if the cause of the communication failure state does not correspond to the first mapping information, it may be recognized whether the cause corresponds to second mapping information. Whether the cause corresponds to the second mapping information may be determined as the control unit 250 of the external component 200 recognizes that the electric appliance 100 is not connected to the communication channel (S94).

If the cause of the communication failure state corresponds to the second mapping information, second communication recovery program is executed. The second communication recovery program transmits a network channel change message to the electric appliance 100, and then, the electric appliance 100 transmits a confirmation signal with respect to the transmission of the network channel change message to the external component 200 (S95).

When the confirmation signal is received by the external component 200, the electric appliance 100 and the external component 200 may be converted into a communicable state therebetween (S93).

In the operation S91, if the cause of the communication failure state does not correspond to the second mapping information, it may be recognized whether the cause corresponds to third mapping information. For example, the third mapping information may be a case in which the external component 200 is turned off due to the blackout (S96).

If the cause of the communication failure state corresponds to the third mapping information, third communication recovery program is executed. The third communication recovery program stands by until the external component 200 is turned on, and if the power is turned on, a communication preparation state message is transmitted from the external component 200 to the electric appliance 100, and thus, the electric appliance 100 transmits a confirmation signal with respect to the transmission of the communication preparation state message to the external component 200 (S97).

When the external component 200 is turned on, and the communication preparation state message and the confirmation signal are transmitted or received, the electric appliance 100 and the external component 200 may be converted into a communicable state therebetween (S93).

In the operation S96, if the cause of the communication failure state does not correspond to the third mapping information, it may be recognized whether the cause corresponds to fourth mapping information. Whether the cause corresponds to the fourth mapping information may be determined as the control unit 250 of the external component 200 recognizes that the electric appliance 100 has withdrawn from the network (S94).

When the cause of the communication failure state corresponds to the fourth mapping information, the network connection of the electric appliance 100 with respect to the external component 200 may be initialized to attempt reconnection of the network.

When the reconnection of the network is attempted, a network participation request signal may be transmitted from one of the external component 200 and the electric appliance 100 to the other one. Then, the other one receiving the network participation request signal may transmit a permission signal with respect to the network participation request signal to set the network environment construction.

During the network environment construction, at least one channel information for the network key and communication by using the external component 200 as a server may be transmitted from the external component 200 to the electric appliance 100 (S99).

When the network connection between the external component 200 and the electric appliance 100 is reconstructed, the electric appliance 100 and the external component 200 may be converted into a communicable state therebetween (S93).

As described above, the plurality of mapping information that are confirmable with respect to the cause of the communication failure state may be previously determined, and then, when the communication failure state occurs, the user may search the cause of the communication failure state from the mapping information to recover the communication. Therefore, the control for recovering the communication of the electric appliance may be clearly and simply performed.

According to the proposed embodiments, the electric appliance may receive the power information from the external component. Then, the electric appliance may operate in the power-saving mode for saving the power on the basis of the received power information.

Also, the electric appliance may separately receive the first power information corresponding to the present time and the second power information corresponding to the time period after the present time from the external component. Thus, whether the operation of the electric appliance at the present time is advantageous may be effectively recognized.

Also, the user may effectively and easily determine whether the electric appliance operates the present time on the basis of the first power information corresponding to the present time.

Also, when the electric appliance is turned on to communicate with the external component, the electric appliance may receive the power information from the external component. Thus, the new information may be updated at the electric appliance.

Also, the electric appliance may request and receive the power information again after the power information is changed. Then, the received information may be compared to the existing stored power information. There, the accuracy of the power information may be effectively verified.

Also, when the second power information is requested and received after the first power information is received, the first power information may be received together. Thus, since it is confirmed whether the first power information is changed, the accuracy of the first power information may be verified.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric appliance comprising:
a driving unit to operate on the basis of energy price-related information;
a communication unit to communicate with an external component with respect to the energy price-related information; and
a control unit to control the operation of the driving unit on the basis of the energy price-related information received by the communication unit,
wherein, if the control unit determines that the communication unit and the external component are in a communication failure state, the control unit determines a cause of the communication failure state from a plurality of preset mapping information,
wherein the plurality of mapping information comprise:
first mapping information with respect to a change of a network key using the external component as a master device;
second mapping information with respect to a change of a communication channel that is used for the external component and the communication unit;
third mapping information with respect to a state in which the external component is turned off; and
fourth mapping information with respect to an initialization of a network connecting the external component to the communication unit.

2. The electric appliance according to claim 1, wherein, when the network key is changed in a state where the communication unit does not receive an update message of the network key from the external component, the control unit determines that the communication failure cause corresponds to the first mapping information.

3. The electric appliance according to claim 1, wherein, when the network key is changed in a state where the communication unit does not receive a channel change message from the external component, the control unit determines that the communication failure cause corresponds to the second mapping information.

4. The electric appliance according to claim 1, wherein, when the external component is turned off due to an abnormal cause and becomes in the communication failure state, the control unit determines that the communication failure cause corresponds to the third mapping information.

5. The electric appliance according to claim 4, wherein the abnormal cause comprises a blackout or breakdown state.

6. The electric appliance according to claim 1, wherein, when the control unit determines that the electric appliance has withdrawn from the network with the external component, the control unit determines that the communication failure cause corresponds to the fourth mapping information.

7. The electric appliance according to claim 1, wherein, when the control unit determines that the communication failure cause corresponds to at least one of the first to third mapping information, the control unit executes a recovery program to convert the communication failure state into a communicable state.

8. The electric appliance according to claim 7, the recovery program is provided in the electric appliance or the external component.

9. The electric appliance according to claim 7, wherein, when the control unit determines that the communication failure cause corresponds to the first or the second mapping information,
the recovery program transmits a network key update message or a network channel change message to the electric appliance, and then,
the electric appliance transmits a confirmation signal with respect to the transmission of the network key update message or the network channel change message to the external component.

10. The electric appliance according to claim 7, wherein, when the control unit determines that the communication failure cause corresponds to the third mapping information,
the recovery program stands by until the external component is turned on, and if the power is turned on, a communication preparation state message is transmitted from the external component to the electric appliance, and the electric appliance transmits a confirmation signal with respect to the transmission of the communication preparation state message to the external component.

11. The electric appliance according to claim 1, wherein, when the control unit determines that the communication failure cause corresponds to the fourth mapping information,
the control unit controls that the network connection of the electric appliance with respect to the external component is initialized to attempt reconnection of the network,
when the reconnection of the network is attempted, a network participation request signal is transmitted from one of the external component and the electric appliance to the other one of the external component and the electric appliance, and then,
the other one of the external component and the electric appliance receiving the network participation request signal transmits a permission signal with respect to the network participation request signal to set the network environment construction.

12. The electric appliance according to claim 1, wherein the control unit determines that the communication unit and the external component are in a communication failure state when:
a check signal is transmitted from one of the external component and the communication unit to the other one of the external component and the communication unit, and then
if there is no response signal from the other one of the external component and the communication unit although a transmission number of the check signal exceeds a predetermined reference number, or the transmission time of the check signal is greater than a preset time.

13. The electric appliance according to claim 1, wherein the control unit determines that the communication unit and the external component are in a communication failure state when:
a check signal is transmitted from one of the external component and the communication unit to the other one of the external component and the communication unit, and then
if an intensity of response signal from the other one of the external component and the communication unit is less than a preset intensity.

* * * * *